M. G. McLANE.
FIBER CLEANING MACHINE.
APPLICATION FILED APR. 21, 1909.
984,689.
Patented Feb. 21, 1911.
2 SHEETS—SHEET 1.
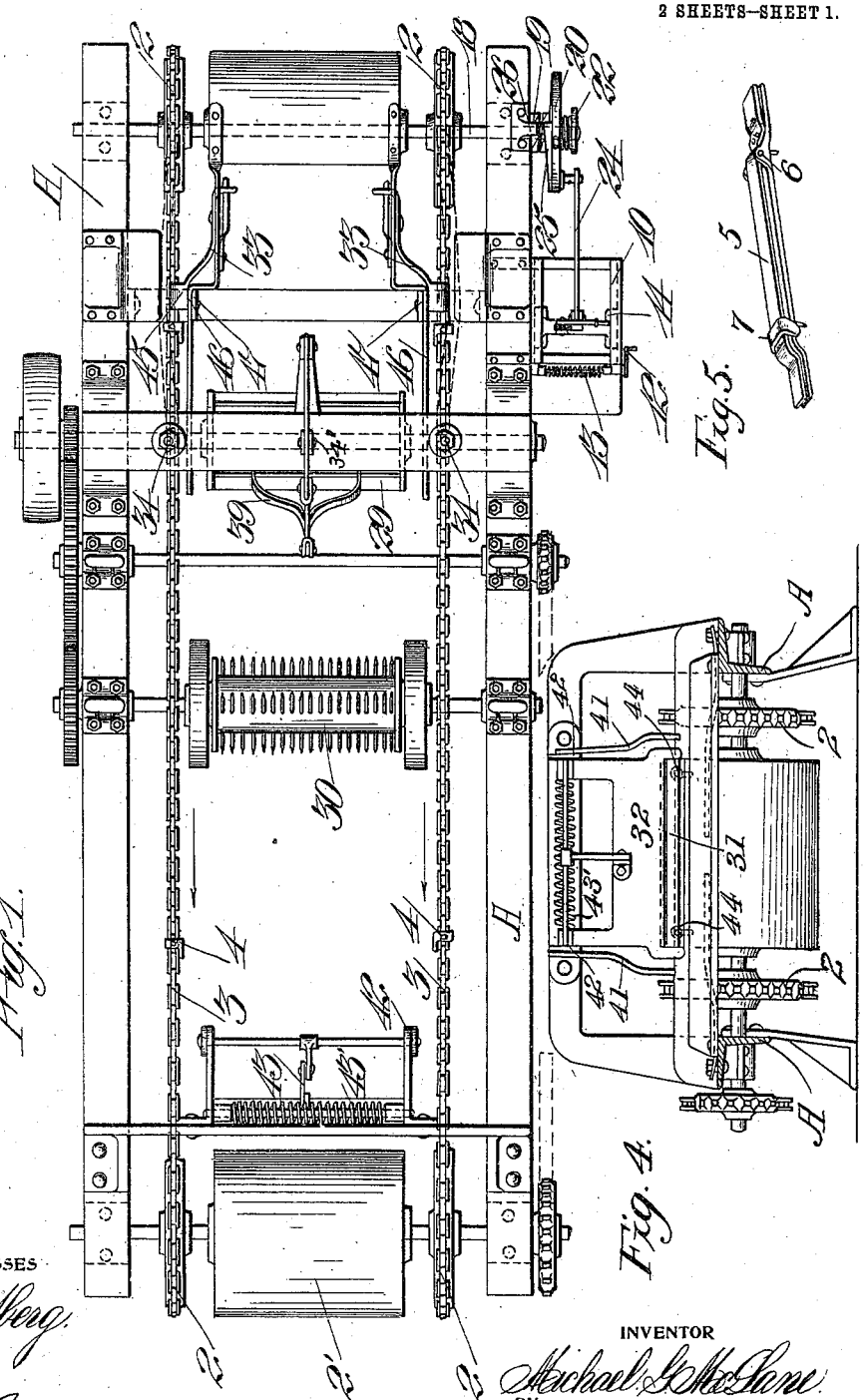

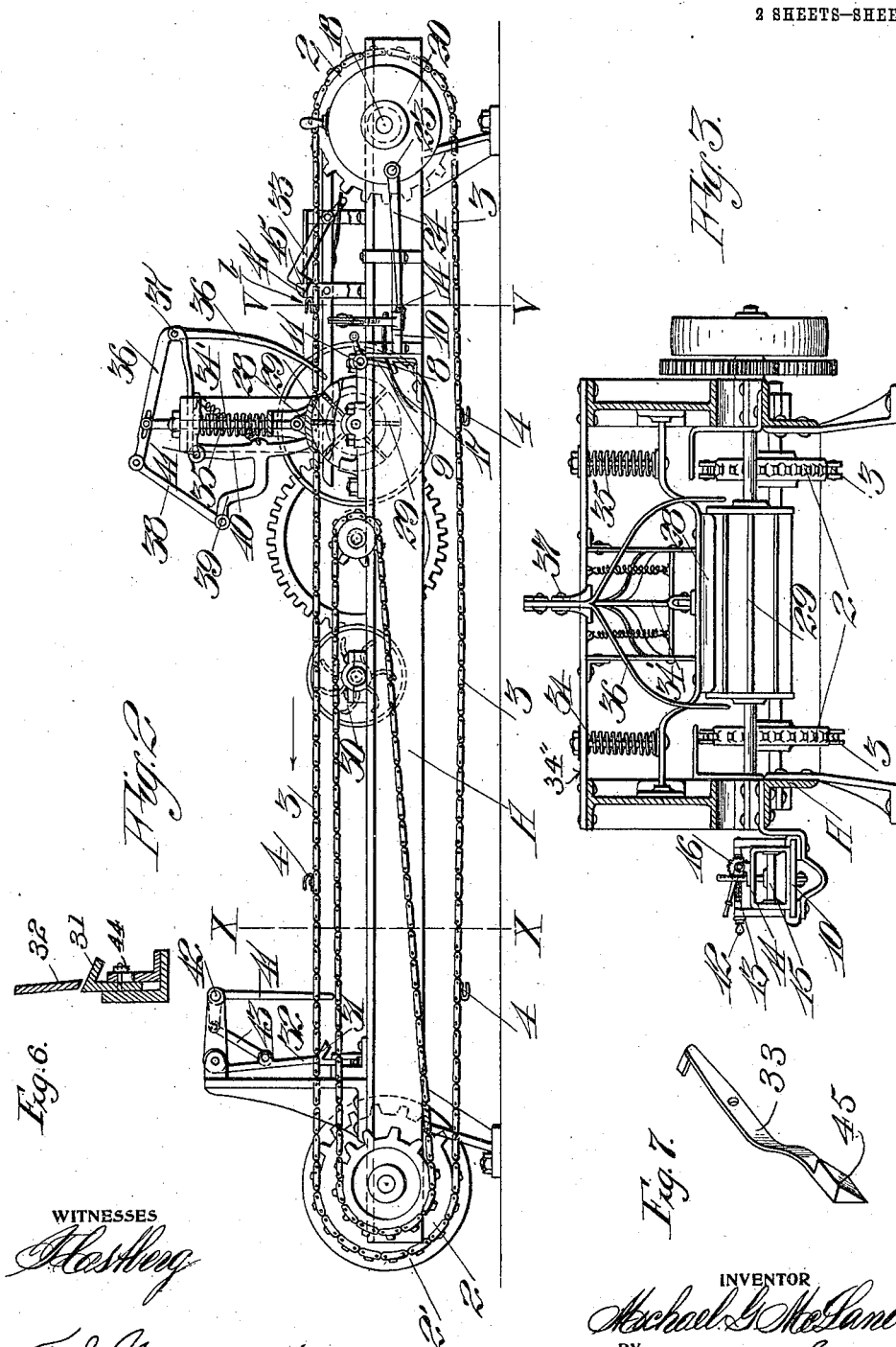

UNITED STATES PATENT OFFICE.

MICHAEL G. McLANE, OF SAN FRANCISCO, CALIFORNIA, ASSIGNOR TO P. H. FRANK, D. G. BEEBE, AND J. T. MADDY, TRADING UNDER THE FIRM-NAME OF McLANE HEMP MACHINE COMPANY, OF ZAMBOANGA, PHILIPPINE ISLANDS.

FIBER-CLEANING MACHINE.

984,689.

Specification of Letters Patent.  Patented Feb. 21, 1911.

Application filed April 21, 1909. Serial No. 491,334.

*To all whom it may concern:*

Be it known that I, MICHAEL G. McLANE, a citizen of the United States, residing in the city and county of San Francisco and State of California, have invented new and useful Improvements in Fiber-Cleaning Machines, of which the following is a specification.

My invention relates to fiber-cleaning machines. Its object is to provide a simple, practical machine for cleaning the fibers of hemp, ramie, and other fibrous plants.

The invention consists of the parts and the construction and combination of parts as hereinafter more fully described and claimed, having reference to the accompanying drawings, in which—

Figure 1 is a plan of the invention. Fig. 2 is a side elevation of the same. Fig. 3 is a section on line V—V, Fig. 2. Fig. 4 is a section on X—X, Fig. 2. Fig. 5 is a detail of a clamp bar. Fig. 6 is a detail of the rear scraper. Fig. 7 is a perspective view of the releasing wedge arm.

A represents a suitable framework on which are mounted the sprockets 2 supporting a pair of endless chains 3. These chains have hooks 4 at suitable intervals to receive the holders or clamp bars 5 by which the stalks to be treated are drawn through the machine. As shown in Fig. 5, this holder comprises two bars hinged together at 6, acting clamp-fashion to grip the plants, and being held together by suitable means, as the spring clip 7. These clamp bars 5 are of a length a little greater than the distance between the chains 3, and it is the end portions of these bars that are adapted to be engaged by the hooks 4. Prior, however, to engaging the raw material in these clamps, it is desired that about six or eight inches, more or less, of the stalks be cleaned, so that this cleaned portion may be caught in the clamps, and then when the stalks have passed through the machine the whole plant will be cleaned, leaving practically none of the pulp adhering to the fiber. To accomplish this preliminary cleaning I may employ any well known mechanism suitable to the purpose. For instance, I may use the scrapers 8 and 9 suitably mounted on the frame 10 at one side of the head end of the frame A, as shown in Figs. 1 and 3. The lower scraper, 8, may be stationary, while the upper scraper is pivoted at 11, and is operated by a suitable handle, 12, to open it away from the scraper 8 against the tension of a spring 13, when it is desired to insert the end of the stalk or bunch of stalks in between the scrapers.

A carrier 14, on the frame 10, carries a clamp 15, which is operated by a rack and pinion 16, so that the clamp may be pressed down to grip the stalk or bunch of stalks and pull the ends from between the scrapers 8—9 when the carrier 14, is moved away from the scrapers. This movement of the fibrous stalks represented at 17, past the closed scrapers 8—9 acts to strip off the wood and pulp and leave the fibrous cleaned ends of the stalks ready to be gripped by a clamp bar 5. The cleaned ends of the stalks are next placed in a clamp bar 5, and the latter is placed in the machine and in front of a pair of hooks 4, at the point indicated by the arrow *b*, Fig. 2. The chain carrier 3 moves continuously, and in the travel of the carrier a clamp bar 5 with its load is moved first under a presser-foot 28 and over the revolving beaters 29, thence past other beaters and combs 30 and between a pair of scraping knives 31—32, thence back around the machine, and finally discharged by means of the wedge arms 33; all as will be hereafter described.

In order to pass a clamp bar 5 beneath the presser-foot 28 and between the scrapers 31—32, the following mechanism is employed: The presser-foot, 28, is carried by suitable sliding stems, 34, the springs, 35, on these stems tending to press the presser-foot downward into juxtaposition with the beaters, 29, which revolve in a direction opposite to the travel of the upper stretch of the carriers, 3. The sliding stems, 34, are at the sides of the presser-foot and their upper ends pass through a top bar, 34″, Fig. 3. At the center of the presser-foot there is pivotally attached a link, 34′, which link extends through the top bar, 34″, and has its upper end pivoted to a slotted lever, 36, by which the presser-foot is raised. The upper end of lever 36 connects by a link 38 with an arm 39 of a pivoted locking bar 40 pivoted at 41. With the parts in the position shown in Fig. 2, the locking bar 40 is swung in over the top of the presser 28 to hold the latter down (after a clamp bar 5 is passed) and keep the fiber and stalks in close contact with the beaters 29, so that the latter will clean the fiber. The front end of the lever 36 depends between the chains 3 into the path of an approaching bar 5, so that when the clamp bar strikes this pendent arm the lever will be rocked and the presser-foot temporarily lifted so as to allow the clamp bar to pass underneath; but as soon as this bar is passed, the presser-foot descends under the action of the springs 35, so that the beaters 29 will clean the stalks. A somewhat similar arrangement is employed to lift the scraper 32 and allow a clamp bar 5 to pass. In this case, levers 41 on shaft 42 fulcrumed in the frame, have their ends depending into the path of the clamp bar. In the center of the shaft is another lever secured to said shaft and connected by a link 43 with the swinging scraper 32; the spring 43' acting to throw the scraper and levers back into normal position. The lower scraper 31 is made adjustable by suitable means, as the set screws 44.

The release of a clamp bar from the carrier is effected in the following manner: The clamp bar holding the fiber, having passed through the various beaters, combers and scrapers, is always automatically released from the carrier. As before described, the clamp bars are of a length a little greater than the distance between the chains 3, and it is the end portions of these bars that are adapted to be engaged by the hooks or carriers 4. As the carrier containing the clamp member 5 nears the end of its travel, and just before said carrier is released it depresses two wedge arms 33. The depression of the wedge arms forces the wedges 45 between the stationary frame 46 and the chains, causing the chains to spread. This spreading action of the chains releases the hooks 4 from the ends of the clamp bar 5, and the latter remains stationary on the frame in front of the stops 47 until the bar and its cleaned fiber are removed by an operator. The operation is repeated for each bar and its bunch of stalks.

Any suitable driving connections between one or the other of the shafts of the sprockets 2 may be employed to operate the revolving beaters 29—30. The drum 2' at the rear end of the machine, and around which the material passes after being pulled through the scrapers 32—31, is fixed to the shaft of these rear sprockets 2 and travels with the shaft, but it is preferably of a little larger diameter than the diameter of the sprockets, so that its periphery travels a little faster than the clamp bar does which holds the material. The result is that the friction caused by the slipping of this drum underneath the material tends to pull on the material and relieve the clamp bars and chain of some of their strain. The other drum at the feed end of the machine may be stationary.

Having thus described my invention, what I claim and desire to secure by Letters Patent is—

1. A fiber-cleaning machine comprising an endless carrier, means for holding the ends of fibrous material to be treated on said carrier, a rotary beater in the path of the material carried, a presser-foot coacting with the beater to hold the material in contact therewith, means operated by said fiber-holding means to lift the presser-foot to allow said holding means to pass, and a locking device for holding the presser-foot down, said locking device operable by said holding means to move said locking device from locking position.

2. A fiber-cleaning machine comprising an endless carrier, fiber-holding means on the carrier, a rotary beater, a coacting presser-foot, said presser-foot carried by a spring-actuated sliding stem, and a bell-crank lever having one arm connected with the stem, and the other arm depending into the path of said fiber-holding means.

3. A fiber-cleaning machine comprising an endless carrier, fiber-holding means on the carrier, a rotary beater, a coacting presser-foot, said presser-foot carried by a spring-actuated sliding stem, a bell-crank lever having one arm connected with the stem, and the other arm depending into the path of said fiber-holding means, and a pivoted locking member movable into and out of the path of the presser and connected with the bell-crank lever and operable in unison therewith.

4. In a fiber-cleaning machine, the combination of an endless carrier comprising spaced parallel chains, fiber-holding means removably supported on the chains, a beater over which the fiber is carried and means for spreading the chains to release said fiber-holding means.

5. In a fiber-cleaning machine, the combination of an endless carrier comprising spaced parallel chains, fiber-holding means removably supported on the chains, a beater over which the fiber is carried and wedge members for spreading the chains to release said fiber-holding means.

6. In a fiber-cleaning machine, the combination of a pair of spaced parallel endless chains having hooks thereon, clamping bars with their ends engageable with the hooks, a beater and a coöperating presser in the path of said clamp bars, means operated by the clamp bars for raising the presser to allow the bars to pass, and means for automatically disengaging said clamp bars from the said hooks.

7. In a fiber-cleaning machine, the combination of a pair of spaced parallel endless chains having hooks thereon, clamp bars with their ends engageable with the hooks, a beater and a coöperating presser in the path of said clamp bars, means operated by the clamp bars for raising the presser to allow the bars to pass, and means for automatically disengaging said clamp bars from the said hooks, said last-named means including means for spreading the chains.

In testimony whereof I have hereunto set my hand in presence of two subscribing witnesses.

MICHAEL G. McLANE.

Witnesses:
 CHARLES EDELMAN,
 C. C. COOK.